(No Model.) 3 Sheets—Sheet 2.

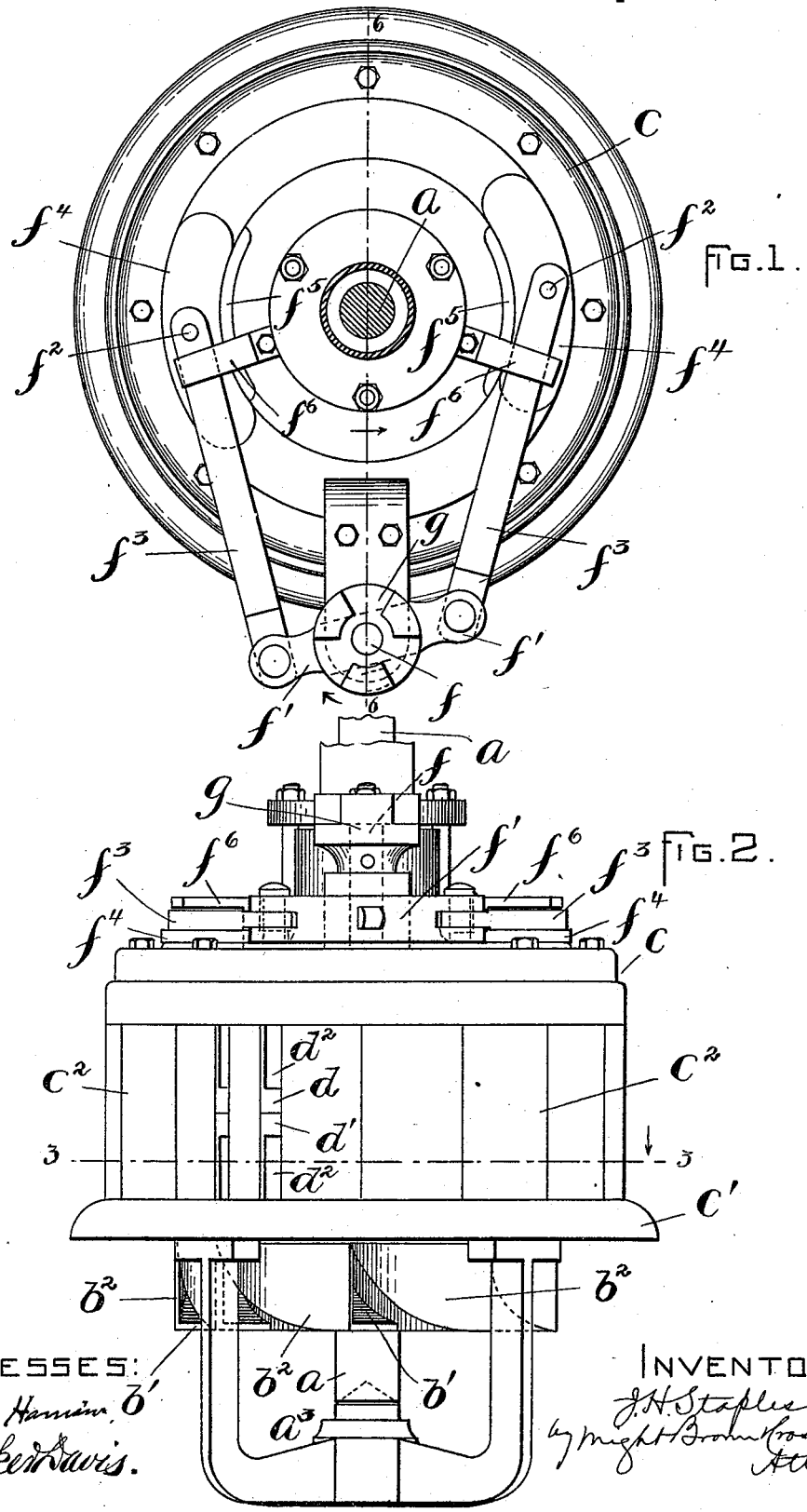

J. H. STAPLES.
TURBINE WATER WHEEL.

No. 518,795. Patented Apr. 24, 1894.

WITNESSES:
A. E. Hanson
F. Parker Davis

INVENTOR:
J. H. Staples
by Might Brown Crosley
Attys.

(No Model.) 3 Sheets—Sheet 3.

J. H. STAPLES.
TURBINE WATER WHEEL.

No. 518,795. Patented Apr. 24, 1894.

WITNESSES:
A. D. Harrison.
Parker Davis.

INVENTOR:
J. H. Staples
by Wright Brown Crosley
Attys.

UNITED STATES PATENT OFFICE.

JOHN H. STAPLES, OF BOSTON, ASSIGNOR OF ONE-HALF TO ENOCH PICCOTT, OF SOMERVILLE, MASSACHUSETTS.

TURBINE WATER-WHEEL.

SPECIFICATION forming part of Letters Patent No. 518,795, dated April 24, 1894.

Application filed June 19, 1893. Serial No. 478,164. (No model.)

*To all whom it may concern:*

Be it known that I, JOHN H. STAPLES, of Boston, in the county of Suffolk and State of Massachusetts, have invented certain new and useful Improvements in Turbine Water-Wheels, of which the following is a specification.

This invention relates to an improvement in turbine water-wheels, and the chief object is to provide an improved construction of gate for controlling the entrance of water to the buckets of the wheel, which gate shall be capable of adjustment to lessen or increase the area of entrance-ports to the wheel according to the condition of the water-supply, so that, when the supply is low, it may be concentrated to produce more effective action on the wheel.

To this end, the invention consists in the novel features of construction and arrangements of parts, as hereinafter described and claimed.

The accompanying drawings illustrate a construction by which the invention may be carried out.

Figure 3:
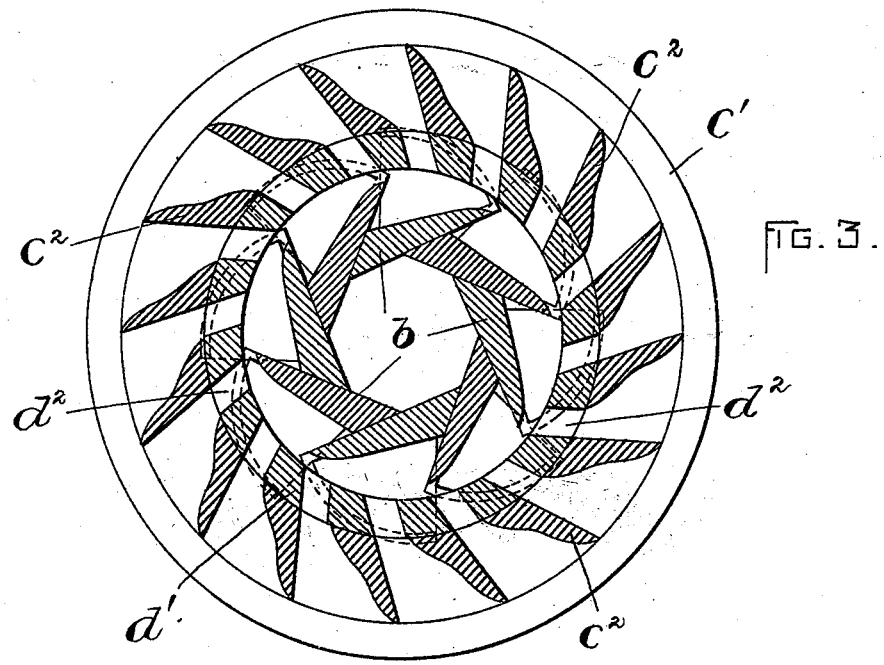
Figure 4:
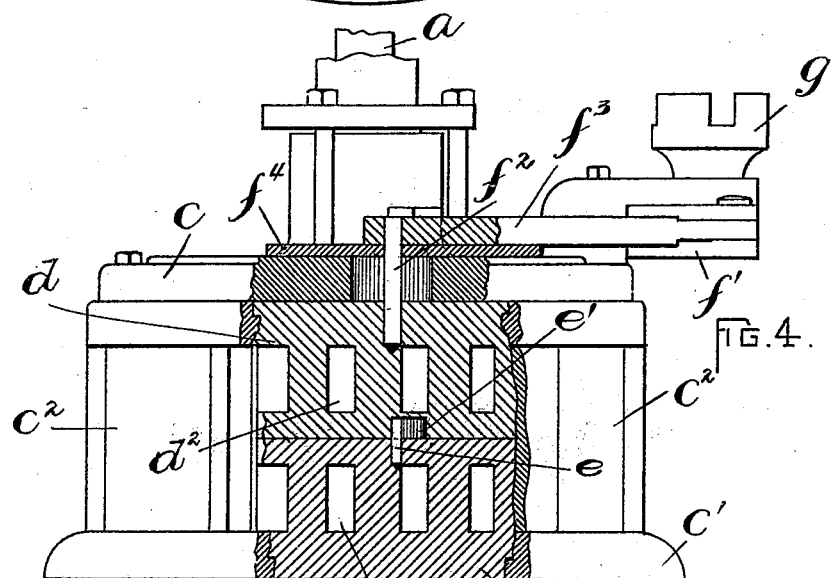
Figure 5:
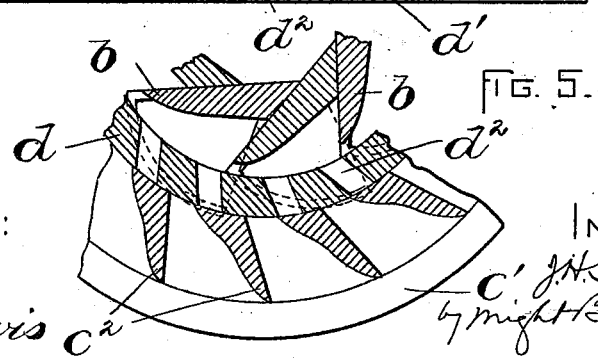
Figure 6:
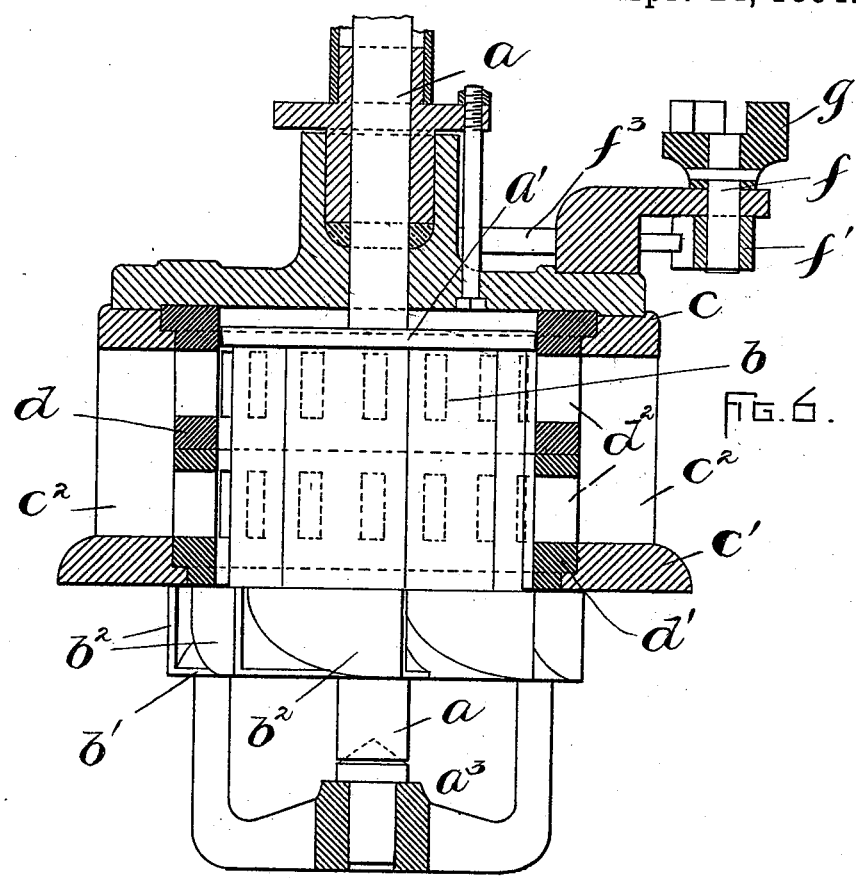
Figure 7:
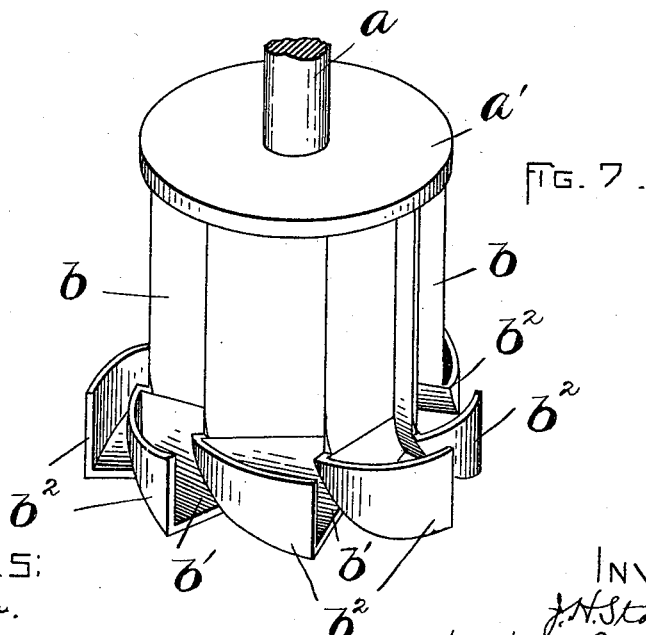

Figure 1 shows a plan view of the structure, with the driven shaft in cross-section. Fig. 2 shows a side elevation. Fig. 3 shows a horizontal section on the line 3—3 of Fig. 2. Fig. 4 shows a part section and part side elevation. Fig. 5 shows a fragmentary sectional view, illustrating the operation of the gate. Fig. 6 shows a vertical section on the line 6—6 of Fig. 1. Fig. 7 shows a detail perspective view of the wheel proper.

The same letters of reference indicate the same parts in all the figures.

In the drawings: the letter $a$ designates the shaft to which the wheel is attached, and which is driven by the wheel. Said shaft carries a circular head $a'$, and the wheel proper is made up of a number of tangentially-arranged blades or buckets $b$, which are conjoined, as illustrated in Fig. 3, the inner end of each blade or bucket abutting one side of the adjoining blade. Each blade or bucket has a laterally-extending inclined or curved delivering-portion $b'$ at its lower end, and a curved shield $b^2$ at the outer edge of said portion $b'$. The shields $b^2$ are eccentric with respect to the center of rotation of the wheel, and break joints or overlap each other, as illustrated in Fig. 7. The lower end of the shaft $a$, which extends below the wheel, is supported by a step-bearing $a^3$.

The wheel is inclosed in a casing, comprising an upper and lower rim $c$ and $c'$, and pitchwater blades $c^2$ which are supported between said rims and form chutes to direct the water into the wheel.

A gate is interposed between the wheel and the exterior casing, and comprises a pair of annular sections $d$ and $d'$, one fitting upon the other, and mounted so as to be capable of oscillation in a horizontal plane. Each annular section is formed with a series of ports $d^2$, adapted to register with the chutes formed between the pitchwater blades $c^2$, but sufficient stock is left between the said ports to completely close said chutes when the gate-sections are moved to the position shown in Fig. 5. The two gate-sections $d$ and $d'$ are connected by means of a pin $e$ secured in the lower section $d'$, and a slot $e'$ formed in the upper section and receiving said pin. Said slot is of sufficient extent to permit an independent movement of the upper section $d$, which will close communication between its ports $d^2$ and the water-supply, while the ports of the lower section remain in communication with the water-supply, or vice versa.

The means here shown for operating the gate consist in a spindle $f$, supported in a bearing on the casing and carrying a cross-head $f'$; pins $f^2$, fastened in the upper gate-section $d$ and projecting through curved slots in the rim $c$; and pitmen $f^3$ connecting the opposite ends of the cross-head $f'$ with the said pins $f^2$. Curved bearing-plates $f^4$ are mounted on the pins $f^2$, and are adapted to slide on the upper surface of the rim $c$ and guided by curved ribs $f^5$ formed on the latter. Keepers $f^6$ extend over the pitmen $f^2$, and serve to hold the same in proper position. When the gate-sections are adjusted as shown in Figs. 2, 4 and 6, the water is admitted to the wheel through the ports in both said sections, and the pin $e$ is at one end of the slot $e'$. If the water-supply is low, and it is desired to concentrate it for action against the wheel, the spindle $f$ is turned in the direction indicated by the arrow in Fig. 1 sufficiently to turn the upper gate-section $d$ to a position where its ports are cut from the supply, as shown in Fig. 5. This movement does not affect the lower gate-section $d'$, by reason of the slot-and-pin connection between the two sections. The former adjustment may be restored by turning the spindle $f$ back again; and, if it is desired to cut off the supply altogether, the spindle is turned still farther back, and the two sections will then move together, the lower section being moved by the engagement of the end of the slot $e'$ against the pin $e$. In this manner the ports of both of the gate sections are cut off from communication with the supply. The ports of only the upper section may be put in communication with the supply, by turning the spindle $f$ only far enough to bring the opposite end of the slot $e'$ into engagement with the pin $e$. It will be observed that, by this construction, when the entrance-port area is to be reduced, one set of ports is completely cut out, and the stream of water is not broken up or disturbed, as would be the case were there but a single set of ports and the size of these ports reduced by adjustment. The spindle $f$ carries a head $g$, of a construction to facilitate the connection of the spindle with operating devices.

It will be observed that the construction here shown may be varied, and therefore the invention is not limited to such construction.

Having thus described my invention, what I claim as new, and desire to secure by Letters Patent, is—

1. A turbine water wheel comprising in its construction the wheel proper provided with buckets; an oscillatory gate controlling the entrance of water to said buckets and composed of two annular sections having interlocking parts in each other's paths of movement under oscillations of the gate, with a clearance for limited movement of one section independent of the other; and oscillating means connected with one of said sections.

2. A turbine water-wheel, comprising in its construction the wheel proper provided with buckets, an oscillatory gate controlling the entrance of water to said buckets and composed of two annular sections, one having a slot and the other a pin engaging said slot, and oscillating means connected with one section.

In testimony whereof I have signed my name to this specification, in the presence of two subscribing witnesses, this 12th day of June, A. D. 1893.

JOHN H. STAPLES.

Witnesses:
  C. F. BROWN,
  A. D. HARRISON.